May 14, 1946.  W. S. SACHER  2,400,468
AUTOMOTIVE BRAKE
Original Filed April 3, 1944
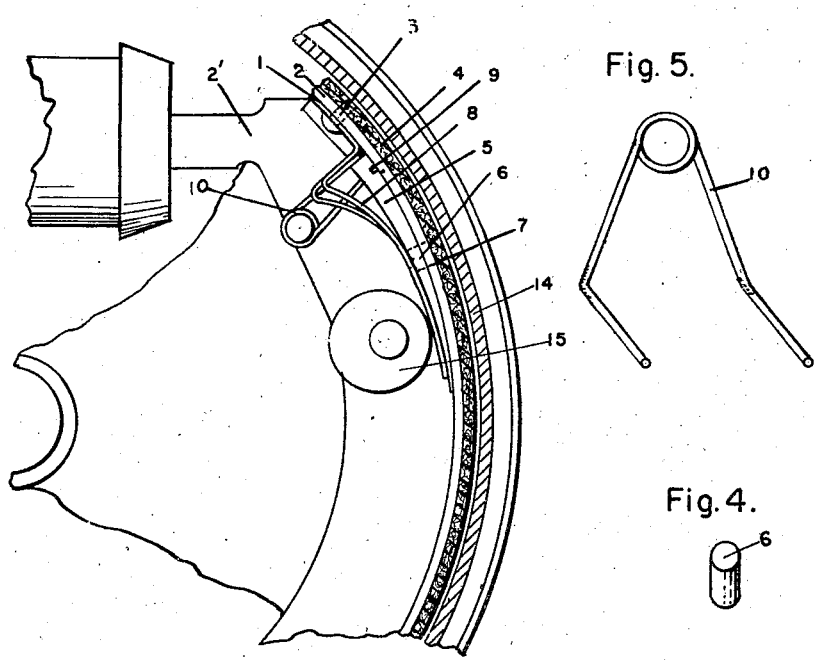
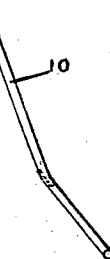
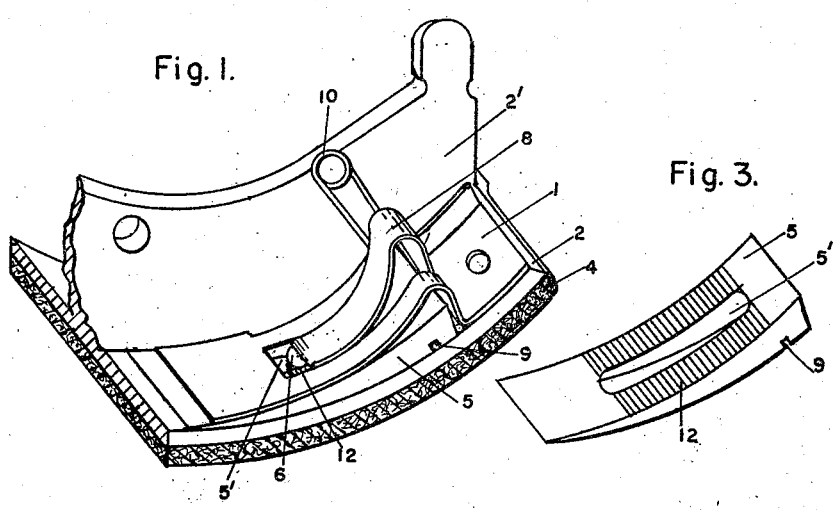
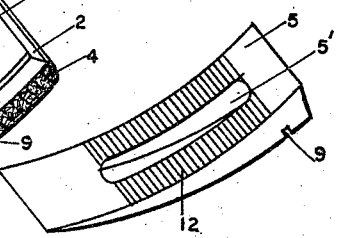
Inventor
William S. Sacher Patented May 14, 1946

2,400,468

UNITED STATES PATENT OFFICE 2,400,468

AUTOMOTIVE BRAKE

William S. Sacher, Pottstown, Pa., assignor of one-half to Isaac C. Shalkop, Philadephia, Pa., and one-fourth to Earl I. Keiser, Pottstown, Pa.

Continuation of application Serial No. 529,244, April 3, 1944. This application October 2, 1944, Serial No. 556,682

2 Claims. (Cl. 188—79.5)

This invention relates to automotive brakes of the hydraulic type, and specifically to automatic compensating means for adjusting the brake shoes to maintain proper spaced relation between the brake shoe and the brake drum when the shoe is in static position.

Brake shoes are faced with special friction lining material which gradually wears away, therefore, periodical adjustment of the brake shoe must be made to restore the range of movement necessary for applying pressure to said brake shoe within serviceable limits.

Among the difficulties encountered in automotive brake compensating devices is the tendency to effect adjustment when the brake drums are in an expanded condition thereby causing the friction material to drag against the brake drum when the shoes are in their static position.

The object of this invention is to obviate the aforementioned difficulties by a simple means which will compensate for wear of the friction material only. Drum distortion or expansion due to heat will not operate the compensating device; actual wear of the lining is the sole means to effect adjustment.

A further object of the invention is to provide a simple brake compensating means which is actuated only by wear of the friction material and of such simple construction that it may be applied to any existing brake shoes manufactured since 1929 by the simple expedient of removing a single rivet holding the friction lining to the brake shoe, attaching the device to the inner face of the shoe by a rivet, and drilling a hole through the lining and the shoe in proper position. The need for structural changes in the shoe are eliminated.

Among the advantages of the present invention is a simplified construction which can be installed by the automobile mechanic without alteration to the existing structure and thereafter adjust the brake shoe in the usual manner.

Further objects and advantages will be readily apparent from the disclosure as hereinafter exemplified.

In the accompanying drawing:

Figure 1 is a perspective view of the invention disposed upon a fragmentary section of a brake shoe, and Fig. 2 is a fragmentary plan view of a brake drum, backing plate, and a brake shoe with the device placed thereon in its operative position, and Fig. 3 is a perspective view of the adjustment wedge, and Fig. 4 is a perspective view of the adjustment controlling means, and Fig. 5 is a perspective view of a spring which co-operates with the wedge.

Reference characters indicate the same parts in the several figures.

In the practice of the invention as shown in Figure 1, a spring steel wedge housing 1 is secured to the brake shoe 2 by means of a rivet 3 passing through an opening conventionally provided in the brake lining 4 and the shoe 2. The spring steel housing means 1 fits closely against the web 2' of the brake shoe 2 and is thereby prevented from moving laterally.

A compensating wedge 5 is disposed against the inner curved face of the brake shoe 2 and is retained in operative position by the housing means 1, the lower end of which provides a solid face that straddles the wedge slot at the point where the assembly contacts the cam 15 against which the brake shoe rests when in static position. A friction resistant control pin 6, as shown in Fig. 2, passes through a suitable opening 7 previously drilled in the brake lining 4 and the brake shoe 2, and also passes through the slotted opening 5' in the wedge 5 and is centrally disposed under the end of the secondary spring member 8 of the wedge housing 1.

A transverse groove 9 in the under side face of the wedge 5 is provided for receiving one leg of the spring 10, the other leg of the spring 10 being retained on the web side of the brake shoe by the wedge housing 1.

The wedge control spring 10 stabilizes the wedge against retractive movement from vibration while the vehicle is in motion and holds the wedge 5 in physical contact with the wedge housing 1 and is not of sufficient strength to urge the wedge forward to effect adjustment as such forward movement of the wedge is effected by gravity. The slot 5' on the wedge 5 prevents lateral movement of the wedge and holds it in longitudinal alignment with the web 2' of the brake shoe by reason of its engagement with the control pin 6 passing therethrough, and provides the sole means for retaining the wedge in operative relation with the wedge housing.

The secondary wedge retaining spring 8 which is integral with the wedge housing 1 and is formed therefrom, is centrally disposed in said retaining spring, is designed to operate independently from the wedge housing, the operative end thereof straddling the slot 5' in the wedge 5 and engaging the serrated or notched surface 12 of the wedge 5. The intermediate portion of said spring 8 is operatively engaged by the control pin 6 which pin raises the spring 11 upon slight wear of a roughened lining 4 to permit a fractional movement of the wedge 5 to compensate for such wear. The serrated or notched surface 12 in the wedge 5 may be provided to prevent retraction of the wedge by reason of vibration or jarring of the wheel during operation of the vehicle, any type of roughened surface is sufficient to maintain frictional contact between the spring 8 and the wedge 5.

After the device has been attached to the brake shoe 2 and the wedge 5 is placed in its retracted position as shown in Fig. 2, the spaced relation between the shoe 2 and the brake drum 14 is adjusted in the conventional manner by means of the cam 15 which contacts the assembly intermediate of the control pin 6 and the end of the retaining spring 1. In operation, after the wedge member is placed in its completely retracted position and the brake has been adjusted in accordance with accepted standard of clearance as is well known in the art, the substantially friction resistant control pin 6 being a free floating member and interposed longitudinally between the wedge retaining spring 8 and the outer surface of the brake lining substantially maintains its length throughout the serviceable life of the brake lining. The wear of the brake lining gradually reduces the thickness of the shoe assembly and when the brake is applied to stop the vehicle, the control pin 6 fractionally raises the wedge spring 8 thereby allowing the wedge to move forward by gravity to compensate for the brake lining wear and thereby restores the original clearance space between the brake shoe and the brake drum when the shoe assembly returns to its static position.

This application is a continuation of my application Serial No. 529,244, filed April 3, 1944, now abandoned.

What is claimed as the invention and desired to be secured by Letters Patent, is:

1. A brake shoe adjusting mechanism adapted for use with hydraulic automotive brake assemblies having retractable brake shoes and the conventional adjustment cam comprising, a wedge member, a slotted wedge housing interposed between the brake shoe and the conventional adjustment cam adapted to cover a slot in the wedge at its lower cam contacting end, a slot in the wedge member adapted to be engaged by a free floating control pin to retain the wedge in longitudinal alignment with the brake shoe, a wedge control spring straddling the slot in the wedge member and holding said wedge against the inner surface of the brake shoe, and a free floating control pin passing through the brake shoe and brake lining adapted to actuate the wedge control spring when in contact with the brake drum to permit forward gravitational movement of the wedge to effect compensation for brake lining wear.

2. A brake shoe compensating mechanism according to claim 1, and a vibration control spring to prevent retractive movement of the wedge.

WILLIAM S. SACHER.